United States Patent

Horng (10) Patent No.: US 9,054,564 B2
(45) Date of Patent: Jun. 9, 2015

(54) MOTOR WITH OIL STORAGE FUNCTION (75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 336 days.

(21) Appl. No.: 13/557,297

(22) Filed: Jul. 25, 2012

(65) Prior Publication Data
US 2013/0200738 A1 Aug. 8, 2013

(30) Foreign Application Priority Data

Feb. 4, 2012 (TW) .............................. 101103697 A (51) Int. Cl.
H02K 5/167 (2006.01)
H02K 5/173 (2006.01)

(52) U.S. Cl.
CPC .............. H02K 5/1735 (2013.01); H02K 5/167 (2013.01)

(58) Field of Classification Search
CPC ........................... H02K 5/167; F16C 2370/12
USPC ............. 384/100, 107, 114, 119, 120; 310/90
See application file for complete search history.

(56) References Cited

U.S. PATENT DOCUMENTS

| | | | |
|---|---|---|---|
| 6,242,830 B1 * | 6/2001 | Katagiri | 384/114 |
| 6,654,213 B2 | 11/2003 | Horng et al. | |
| 6,843,602 B2 * | 1/2005 | Koseki et al. | 384/107 |
| 6,954,017 B2 * | 10/2005 | Takahashi et al. | 310/90 |
| 7,023,116 B2 * | 4/2006 | Kuribara | 384/107 |
| 7,314,314 B2 | 1/2008 | Hong et al. | |
| 8,207,643 B2 * | 6/2012 | Horng et al. | 384/107 |
| 2002/0037116 A1 * | 3/2002 | Nishida et al. | 384/114 |
| 2007/0071374 A1 | 3/2007 | Hong et al. | |
| 2007/0098310 A1 | 5/2007 | Hong et al. | |
| 2007/0176504 A1 * | 8/2007 | Otsuki et al. | 310/90 |
| 2010/0127588 A1 * | 5/2010 | Horng | 310/90 |

FOREIGN PATENT DOCUMENTS

TW M337015 U 7/2008

* cited by examiner

Primary Examiner — Thomas R Hannon
(74) Attorney, Agent, or Firm — Alan D. Kamrath; Kamrath IP Lawfirm, P.A.

(57) ABSTRACT

A motor with an oil storage function includes a base, a bearing, a stator unit and a rotor. The base includes a shaft tube portion having a closed end and an open end. The bearing is received in the shaft tube portion of the base. The stator unit is fixed to the base and has an insulation unit. The insulation unit has a blocking portion extending towards the open end of the shaft tube portion. The rotor includes a hub having a shaft and a permanent magnet. The shaft is rotatably coupled with the bearing, and an air gap is formed between the permanent magnet and the stator unit. The blocking portion of the insulation unit, the shaft tube portion and the bearing jointly form an enlarged oil chamber at the open end of the shaft tube portion.

45 Claims, 9 Drawing Sheets

MOTOR WITH OIL STORAGE FUNCTION

BACKGROUND OF THE INVENTION

1. Field of the Invention

The present invention generally relates to a motor and, more particularly, to a motor with an oil storage function.

2. Description of the Related Art

Conventional motors often include a base. A shaft tube is arranged at the center of the base for receiving a bearing to be coupled to a shaft of a rotor. A stator may be fitted around the shaft tube and drive the rotor to rotate.

The motors usually have an oil chamber in the shaft tube for storing lubricating oil. The lubricating oil makes the shaft rotate smoothly and prolongs the service life of the motor. Taiwan Patent Publication Nos. 200712335 entitled "A MOTOR WITH AN OIL LEAKAGE PREVENTION STRUCTURE", 200612044 entitled "AN OIL LEAKAGE PREVENTION STRUCTURE FOR A SHAFT", and 200717976 entitled "A BEARING WITH AN OIL BUFFERING AND STORING FUNCTION" disclose several motors with oil storage functions. In these applications, the motors form an expansion portion in the shaft tube or form a shrinkage portion on the top of the bearing. After a shaft tube assembly is installed in the shaft tube, an oil chamber will be formed based on the expansion portion or the shrinkage portion for accommodation of lubricating oil. The shaft tube assembly may be a positioning ring (lid) or the like. However, the oil chamber is not large enough to accommodate the required quantity of lubricant oil, as described in detail later.

Figure 1:
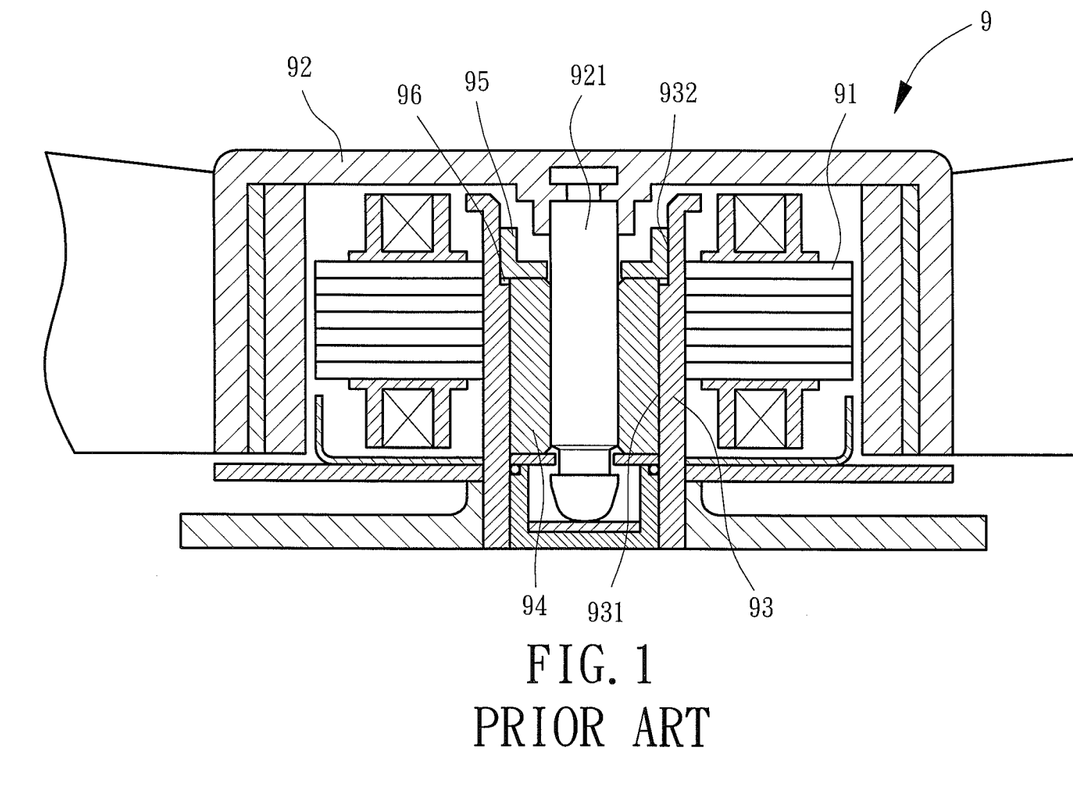
FIG. 1 is a cross-sectional view of a conventional motor with an oil storage function.

As an example, FIG. 1 shows a conventional motor 9 disclosed in Taiwan Patent Publication No. 200712335. The motor 9 includes a stator 91, a rotor 92, a shaft tube 93, a bearing 94 and a positioning ring 95. The stator 91 is fitted around the shaft tube 93. The shaft tube 93 forms a hole 931 with a small diameter, as well as a hole 932 with a large diameter. The bearing 94 is installed in the shaft tube 93. The rotor 92 has a shaft 921 coupled with the bearing 94. The positioning ring 95 is installed in the hole 932. In this arrangement, the hole 932, the positioning ring 95 and the bearing 94 will jointly form an oil chamber 96.

In the motor 9, after the positioning ring 95 is installed in the shaft tube 93, the positioning ring 95, the hole 932 and the bearing 94 will jointly form the oil chamber 96. The positioning ring 95 also prevents the lubricant oil from leaking out of the shaft tube 93. However, the positioning ring 95 takes up a larger space in the shaft tube 93 when the positioning ring 95 is installed in the shaft tube 93. As such, the available space in the oil chamber 96 becomes smaller. Therefore, the oil chamber 96 will not be able to sufficiently accommodate the quantity of lubricant oil necessary for proper and efficient operation of the motor 9, resulting in a shortage of lubricant oil when the motor 9 operates for a long duration of time. This will hinder or even halt the operation of the motor 9, shortening the service life of the motor 9.

Furthermore, it not only causes inconvenient assembly but also increases the component quantity of the motor 9 when the positioning ring 95 is used, leading to high cost of the motor 9.

In light of the above problems, it is necessary to improve the conventional motor 9.

SUMMARY OF THE INVENTION

It is therefore the objective of this invention to provide a motor that has a larger space in the shaft tube portion for accommodation of the quantity of lubricant oil necessary for smooth and efficient operation of the motor.

It is another objective of this invention to provide a motor capable of sufficiently accommodating the lubricant oil based on a simple structure.

The invention discloses a motor with an oil storage function, which includes a base, a bearing, a stator unit and a rotor. The base includes a shaft tube portion having a closed end and an open end. The bearing is received in the shaft tube portion of the base. The stator unit is fixed to the base and has a core coupled with an insulation unit. The insulation unit has a blocking portion extending towards the open end of the shaft tube portion. The rotor includes a hub having a shaft and a permanent magnet. The shaft is rotatably coupled with the bearing. An air gap is formed between the permanent magnet and the stator unit. The blocking portion of the insulation unit, the shaft tube portion and the bearing jointly form an enlarged oil chamber at the open end of the shaft tube portion.

In a preferred form shown, the shaft tube portion has an expansion section at the open end thereof, and the expansion section forms a shoulder portion on an inner circumferential wall of the shaft tube portion. A bottom face of the blocking portion, the expansion section of the shaft tube portion, the shoulder portion, and an outer circumferential wall of the bearing jointly form the enlarged oil chamber.

Alternatively, the bearing has a first end face facing the closed end and a second end face facing the open end. The bearing has an outer circumferential wall and forms a shrinkage section on the part of the outer circumferential wall adjacent the second end face thereof. The shrinkage section forms a recess portion. The bottom face of the blocking portion, the inner circumferential wall of the shaft tube portion, and the recess portion of the bearing jointly form the enlarged oil chamber.

Alternatively, the bottom face of the blocking portion, the expansion section of the shaft tube portion, the shoulder portion of the shaft tube portion, and the recess portion of the bearing jointly form the enlarged oil chamber.

Based on the concepts of invention, the motors of the invention may further include the following features.

In a preferred form shown, the blocking portion of the insulation unit has at least one vent communicating with the enlarged oil chamber.

In the preferred form shown, the blocking portion of the insulation unit has a bottom face pressing the second end face of the bearing.

In the preferred form shown, the enlarged oil chamber has a height in an axial direction of the rotor, the first end face and the second end face are spaced from each other by a minimal axial distance, and the height is equal to or larger than 10% of the minimal axial distance.

In the preferred form shown, the shaft tube portion forms a positioning portion on an outer circumferential wall thereof, and the stator unit is fitted around the shaft tube portion and positioned on the positioning portion.

In the preferred form shown, a neck is formed on an outer circumferential wall of the shaft. An engaging member is arranged in the shaft tube portion, positioned between the bearing and the closed end of the shaft tube portion, and engaged with the neck of the shaft. Alternatively, the blocking portion of the insulation unit is in the form of a plurality of engaging panels extending radially towards the open end of the shaft tube portion. A groove is formed between two adjacent engaging panels, and each engaging panel has an end engaging with the neck of the shaft.

In the preferred form shown, the insulation unit consists of an upper insulation sleeve and a lower insulation sleeve. The core is sandwiched between the upper and lower insulation sleeves. The blocking portion is arranged on the upper insulation sleeve.

The closed end of the shaft tube portion is coupled with the base plate portion to form a lower oil chamber. An oil passageway is formed between the bearing and the shaft tube portion, and communicates with the lower oil chamber and the enlarged oil chamber. The bearing forms a plurality of grooves axially extending on an outer circumferential wall of the bearing, thereby forming the oil passageway. Alternatively, the shaft tube portion forms a plurality of grooves axially extending on an inner circumferential wall of the shaft tube portion, thereby forming the oil passageway.

The shaft tube portion has an inner circumferential wall and forms an annular protrusion on the part of the inner circumferential wall adjacent the closed end of the shaft tube portion. The annular protrusion forms a narrow section in the shaft tube portion. The bearing is positioned on the annular protrusion. The annular protrusion has a plurality of notches communicating the lower oil chamber with the oil passageway.

The blocking portion of the insulation unit is located between the open end of the shaft tube portion and the hub of the rotor.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
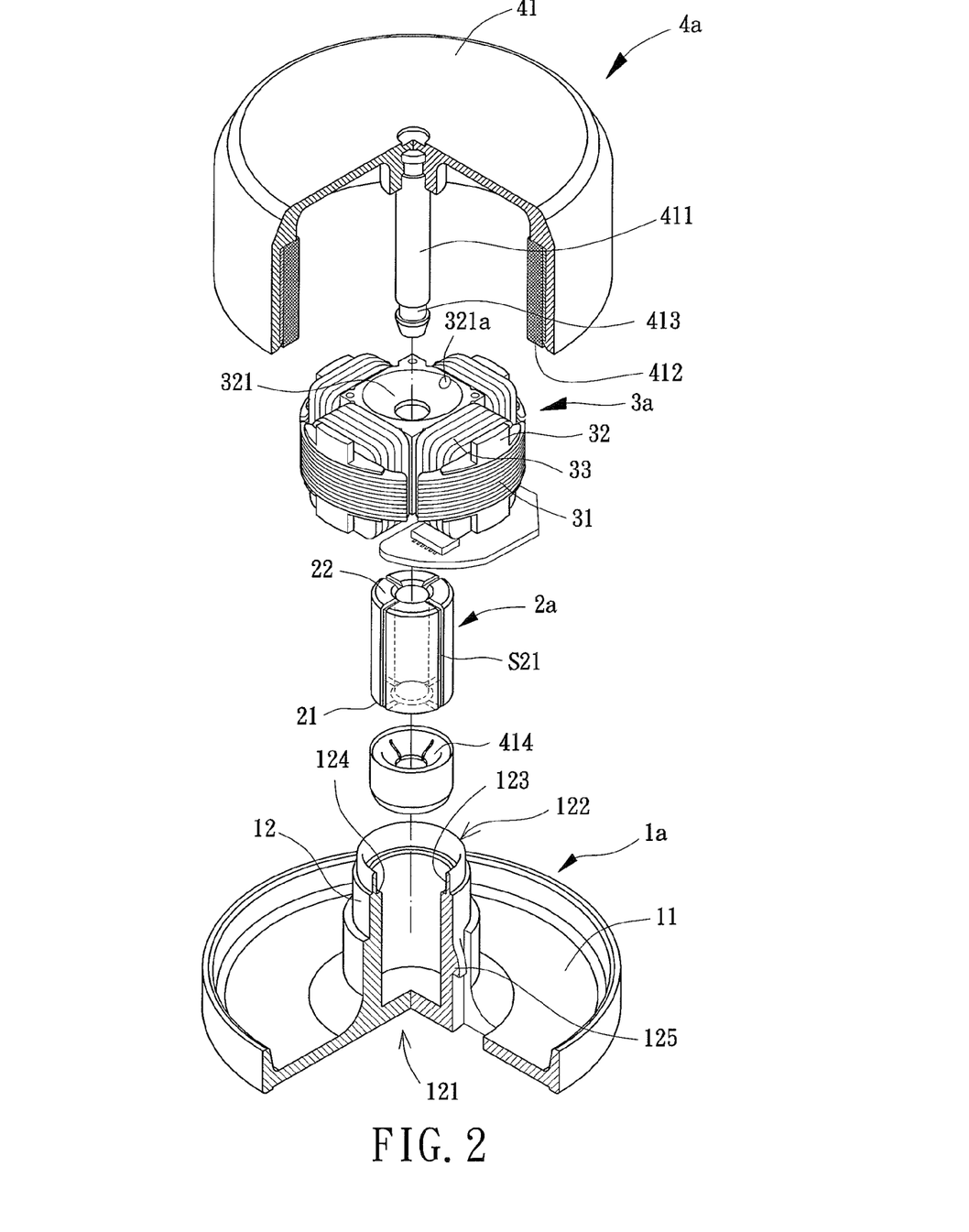
FIG. 2 is an exploded view of a motor with an oil storage function according to a first embodiment of the invention.
Figure 3:
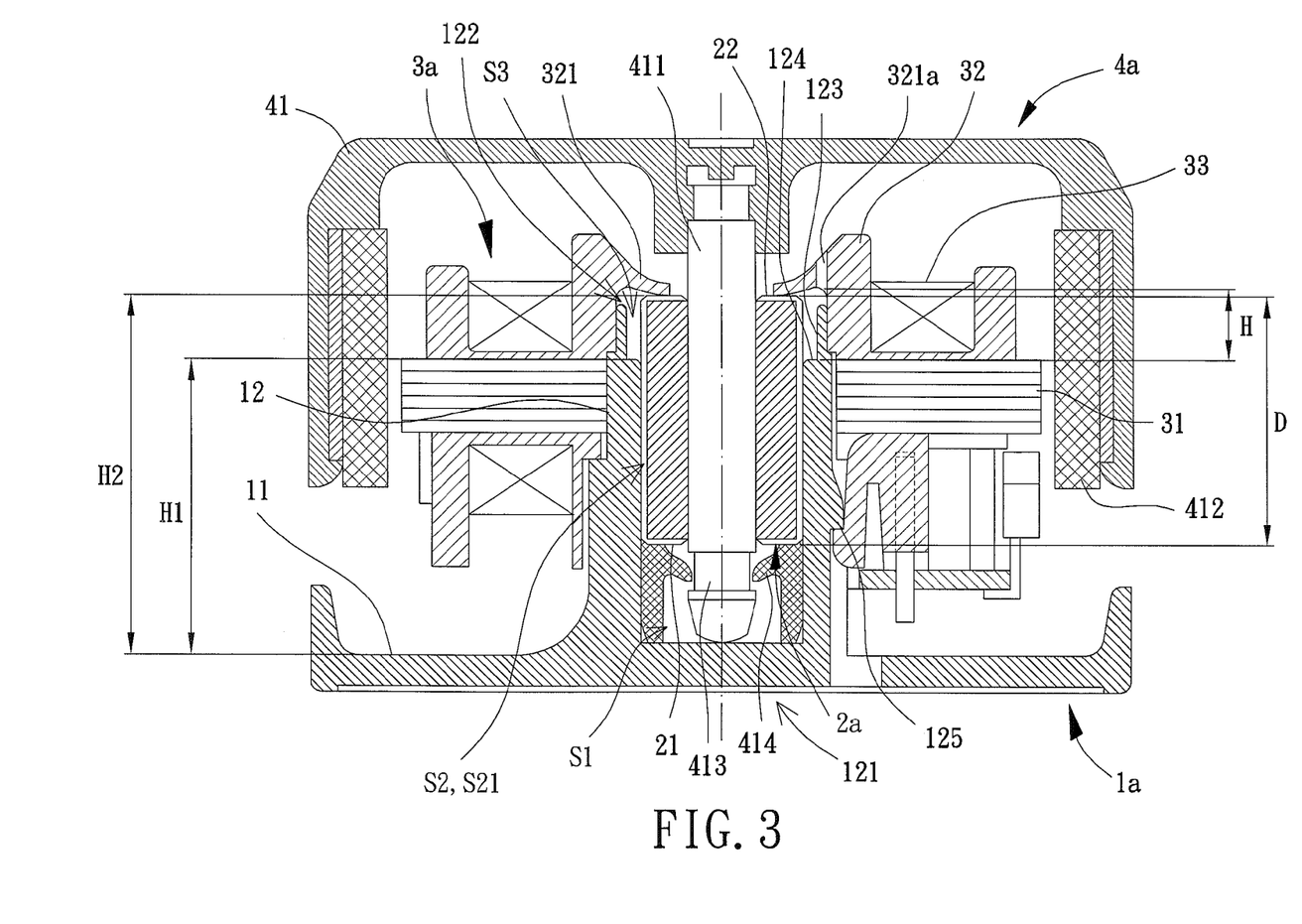
FIG. 3 is a cross-sectional view of the motor of the first embodiment of the invention.

Referring to FIGS. 2 and 3, a motor with an oil storage function is disclosed according to a first embodiment of the invention. The motor includes a base 1a, a bearing 2a, a stator unit 3a and a rotor 4a, The base 1a may be mounted with the bearing 2a and coupled with the stator unit 3a. The rotor 4a is rotatably coupled with the bearing 2a.

The base 1a includes a base plate portion 11 and a shaft tube portion 12. The shaft tube portion 12 has a closed end 121 and an open end 122. As shown in FIG. 3, the closed end 121 of the shaft tube portion 12 is coupled with the base plate portion 11 to form a lower oil chamber S1. The shaft tube portion 12 has an expansion section 123 at the open end 122. The expansion section 123 forms a shoulder portion 124 on the inner circumferential wall of the shaft tube portion 12. There is a first height H1 between the shoulder portion 124 and the base plate portion 11. The shaft tube portion 12 preferably forms a positioning portion 125 on the outer circumferential wall of the shaft tube portion 12 for positioning the stator unit 3a.

The bearing 2a is installed in the shaft tube portion 12 of the base 1a to form an oil passageway S2 between the bearing 2a and the shaft tube portion 12, with the oil passageway S2 communicating with the lower oil chamber S1. The bearing 2a may form a plurality of grooves S21 extending axially on the outer circumferential wall of the bearing 2a. The oil passageway S2 will be formed between the grooves S21 and the bearing 2a after the bearing 2a is installed in the shaft tube portion 12. Alternatively, the shaft tube portion 12 may form a plurality of grooves (not shown) on the inner circumferential wall of the shaft tube portion 12. In this regard, the oil passageway S2 is formed between the grooves and the bearing 2a. This allows the lubricant oil to smoothly flow to the lower oil chamber S1 along the oil passageway S2.

The bearing 2a has a first end face 21 facing the closed end 121 and a second end face 22 facing the open end 122. As shown in FIG. 3, there is a second height H2 between the second end face 22 and the base plate portion 11. The second height H2 is preferably larger than the first height H1.

The stator unit 3a is fixedly mounted on the base 1a. In the embodiment, the stator unit 3a is fitted around the shaft tube portion 12. The stator unit 3a may be coupled with the shaft tube portion 12 by close fitting, adhesion or the like, ensuring reliable assembly between the stator unit 3a and the shaft tube portion 12.

The stator unit 3a has a core 31 (formed by silicon steel plates being stacked, for example) coupled with an insulation unit 32. The insulation unit 32 is wound with an enameled wire to form a coil unit 33. The insulation unit 32 has a blocking portion 321 extending towards the open end 122 of the shaft tube portion 12 in the radial direction of the motor. In this embodiment, the insulation unit 32 consists of upper and lower insulation sleeves. The core 31 is sandwiched between the upper and lower insulation sleeves. The blocking portion 321 is arranged on the upper insulation sleeve. As shown in FIG. 3, the blocking portion 321, the expansion section 123, the shoulder portion 124 and the bearing 2a jointly form an enlarged oil chamber S3. Specifically, the enlarged oil chamber S3 is jointly formed by the bottom face of the blocking portion 321, the expansion section 123, the shoulder portion 124 and the outer circumferential wall of the bearing 2a. The enlarged oil chamber S3 communicates with the oil passageway S2. Thus, the lower oil chamber S1, the oil passageway S2, the enlarged oil chamber S3 and the bearing 2a jointly form a cyclic oil path for the lubricant oil to flow therein. This ensures smooth operation of the rotor 4a and prevents breakdown of the rotor 4a.

The blocking portion 321 of the insulation unit 32 preferably includes at least one vent 321a communicating with the enlarged oil chamber S3. The lubricant oil can smoothly flow along the cyclic oil path formed by the lower oil chamber S1, the oil passageway S2, the enlarged oil chamber S3 and the bearing 2a. In addition, the bottom face of the blocking portion 321 preferably presses the second end face 22 of the bearing 2a to prevent loosening of the bearing 2a. Thus, the components received in the shaft tube portion 12 will be firmly coupled together by the blocking portion 321.

When the stator unit 3a is fitted around the shaft tube portion 12, the positioning portion 125 of the shaft tube portion positions the stator unit 3a axially, preventing the stator unit 3a from being installed in a position that is higher or lower than the proper position of the stator unit 3a. This prevents the blocking portion 321 of the insulation unit 32 from being positioned inside the shaft tube portion 12. Thus, it can be ensured that the blocking portion 321 will not occupy any space in the oil chamber of the shaft tube portion 12. Furthermore, the blocking portion 321 can properly press the bearing 2a, preventing the blocking portion 321 from breaking due to an improperly lower installation position of the stator unit 3a. Thus, the blocking portion 321 will function in a best manner based on the arrangement of the positioning portion 125 while providing convenient assembly of the stator unit 3a.

The rotor 4a includes a hub 41 having a shaft 411 and a permanent magnet 412. The shaft 411 extends through the blocking portion 321 of the insulation unit 32 to rotatably couple with the bearing 2a. There is an air gap between the permanent magnet 412 and the stator unit 3a. The alternating magnetic fields generated by the coil unit 33 of the stator unit 3a react with the permanent magnet 412, driving the rotor 4a to rotate.

The shaft 411 may have a neck 413 at the bottom end of the shaft 411, with the neck 413 arranged on the outer circumferential wall of the shaft 411. As shown in FIG. 3, an engaging member 414 corresponding to the neck 413 may be installed in the shaft tube portion 12. The engaging member 414 is positioned between the bearing 2a and the closed end 121 of the shaft tube portion 12. In this arrangement, the engaging member 414 will engage with the neck 413 of the shaft 411 to prevent disengagement of the rotor 4a from the bearing 2a.

The motor in the first embodiment is characterized in forming the enlarged oil chamber S3 by the blocking portion 321, the expansion section 123, the shoulder portion 124 and the outer circumferential wall of the bearing 2a, and the blocking portion 321 may be directly formed on the insulation unit 32 of the stator unit 3a. In contrast to the prior art applications, the oil chamber in the conventional motors cannot be formed in the shaft tube or on the bearing until the positioning ring (the lid) is installed in the shaft tube (references can be made to the prior art applications cited in the Description of the Related Art for more details). Specifically, since the blocking portion 321 of the insulation unit 32 can be positioned between the open end 122 of the shaft tube portion 12 and the hub 41 of the rotor 4a, the enlarged oil chamber S3 will be formed without installation of the shaft tube assembly (i.e. the positioning ring or the lid) in the shaft tube portion 12. In other words, the blocking portion 321 of the insulation unit 32 does not occupy a large space in the shaft tube portion 12, so that the enlarged oil chamber S3 will be able to accommodate a larger amount of lubricant oil. Advantageously, the bearing 2a will still rotate smoothly when the motor operates for a long duration of time. This prevents unstable operation or breakdown of the motor, prolonging the service life of the motor. Furthermore, it is no longer required to install a larger quantity of components into the shaft tube portion 12, achieving convenient assembly and cost reduction.

Figure 4:
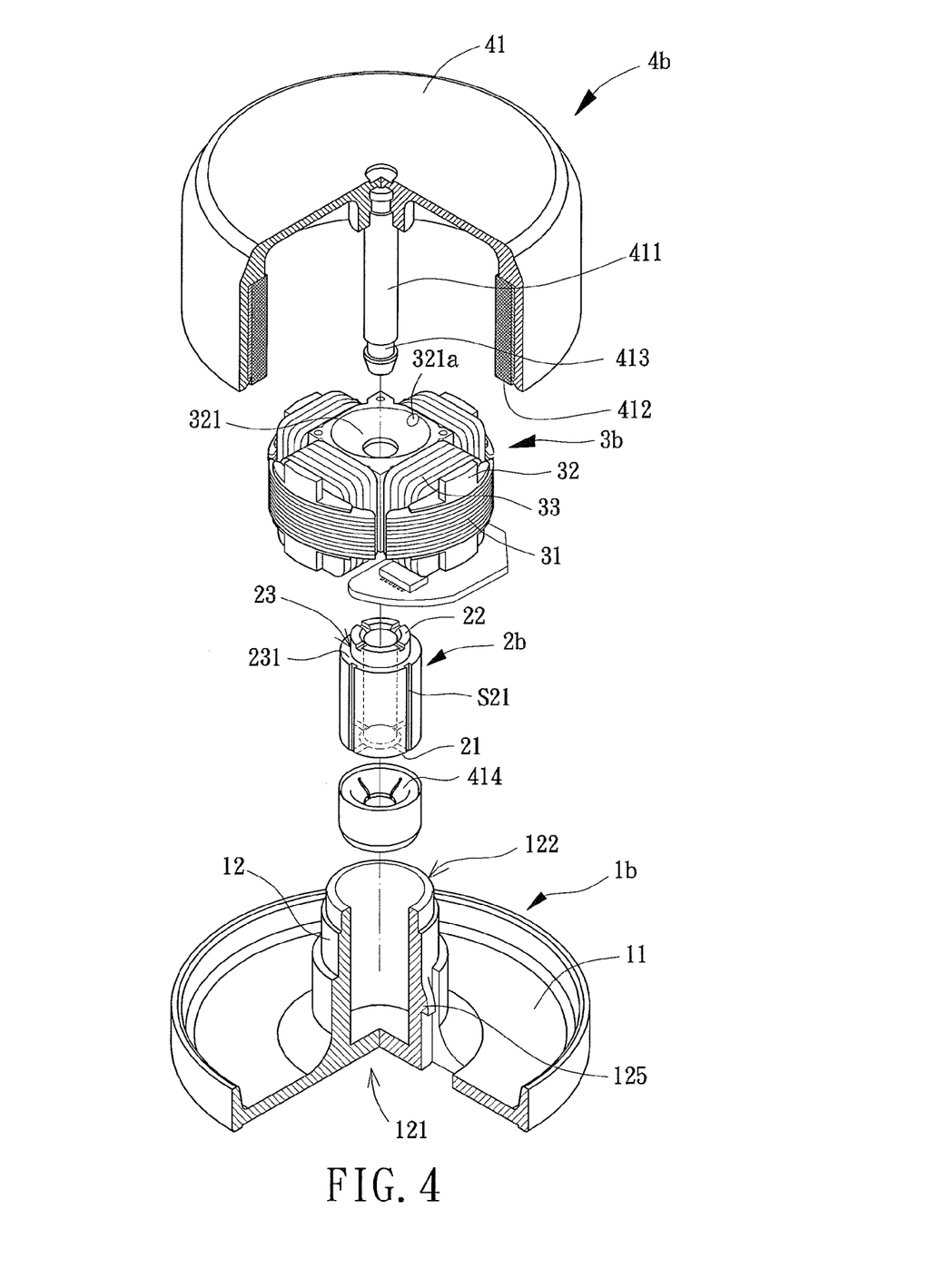
FIG. 4 is an exploded view of a motor with an oil storage function according to a second embodiment of the invention.
Figure 5:
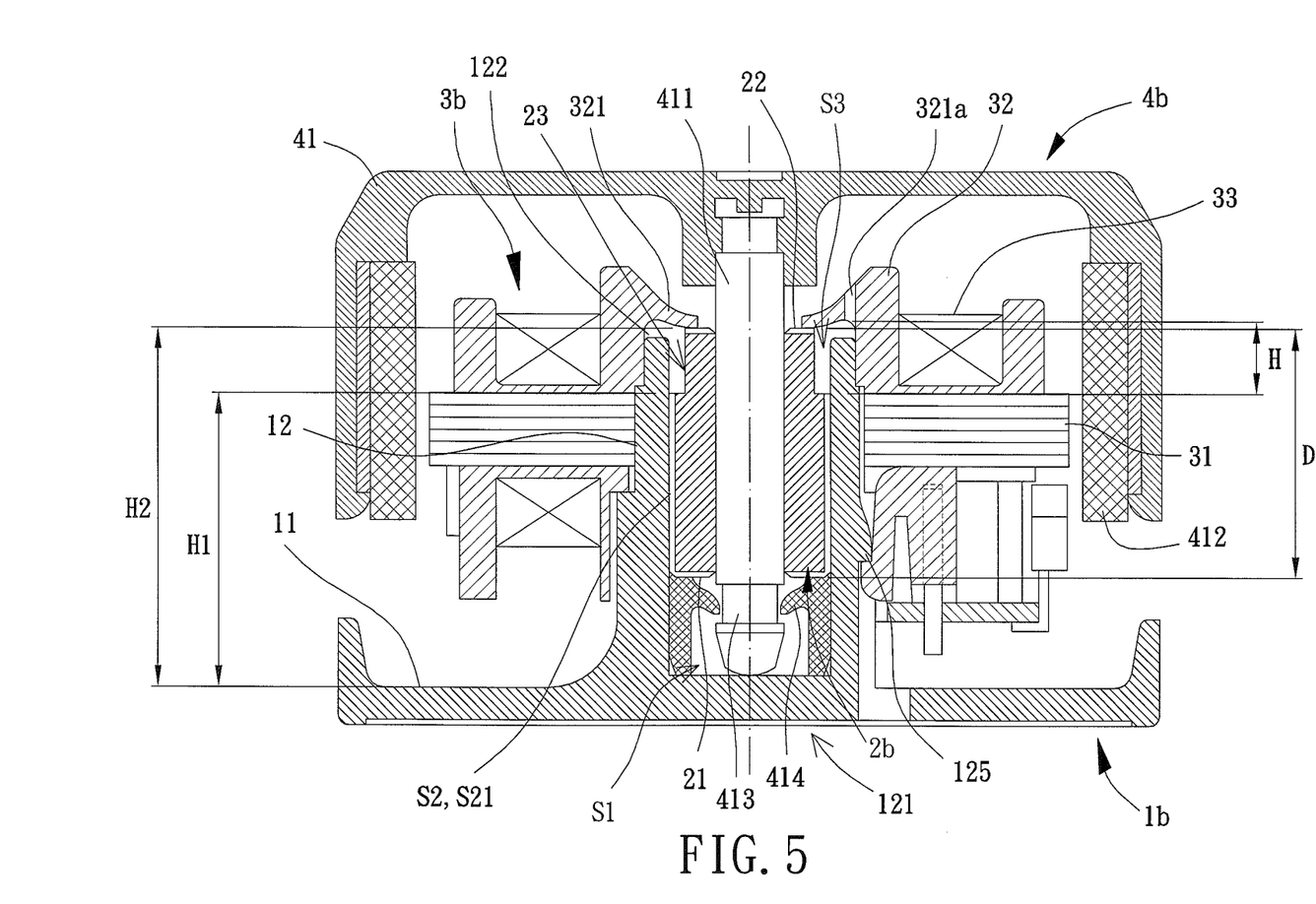
FIG. 5 is a cross-sectional view of the motor of the second embodiment of the invention.

Referring to FIGS. 4 and 5, a motor with an oil storage function is disclosed according to a second embodiment of the invention. Similar to the motor in the first embodiment, the motor in the second embodiment also comprises a base 1b, a bearing 2b, a stator unit 3b and a rotor 4b. The stator unit 3b in this embodiment is identical to the stator unit 3a in the first embodiment, and the rotor 4b in this embodiment is identical to the rotor 4a in the first embodiment. The similarities between the base 1a and the base 1b, as well as between the bearing 2a and the bearing 2b, are not described again for brevity. The differences between the base 1a and the base 1b, as well as between the bearing 2a and the bearing 2b, are described as follows.

Different from the base 1a in the first embodiment is that the shaft tube portion 12 of the base 1b in the second embodiment no longer forms the expansion section 123 and the shoulder portion 124 as it does in the first embodiment. Instead, the bearing 2b forms a shrinkage section on the part of the outer circumferential wall of the bearing 2b adjacent the second end face 22, with the shrinkage section forming a recess portion 23.

Based on the difference between the bearing 2b and the bearing 2a, an enlarged oil chamber S3 is formed by the bottom face of the blocking portion 321, the inner circumferential wall of the shaft tube portion 12, and the recess portion 23 of the bearing 2b, as shown in FIG. 5. The enlarged oil chamber S3 communicates with the oil passageway S2, allowing the lower oil chamber S1, the oil passageway S2, the enlarged oil chamber S3 and the bearing 2b to jointly form a cyclic oil path for the lubricant oil to flow therein. This ensures smooth operation of the rotor 4b and prevents breakdown of the rotor 4b.

The motor in the second embodiment is characterized in forming the enlarged oil chamber S3 by the blocking portion 321, the inner circumferential wall of the shaft tube portion 12, and the recess portion 23 of the bearing 2b, in which the blocking portion 321 may be directly formed on the insulation unit 32 of the stator unit 3b. Thus, the enlarged oil chamber S3 will have a larger space. Advantageously, the service life of the motor is prolonged. Convenient assembly and cost reduction are also achieved. Moreover, it is no longer required to form the expansion section 123 and the shoulder portion 124 on the shaft tube portion 12 in this embodiment, as compared to the motor in the first embodiment. Thus, the structure of the shaft tube portion 12 is simplified while the strength of the shaft tube portion 12 is enhanced.

Figure 6:
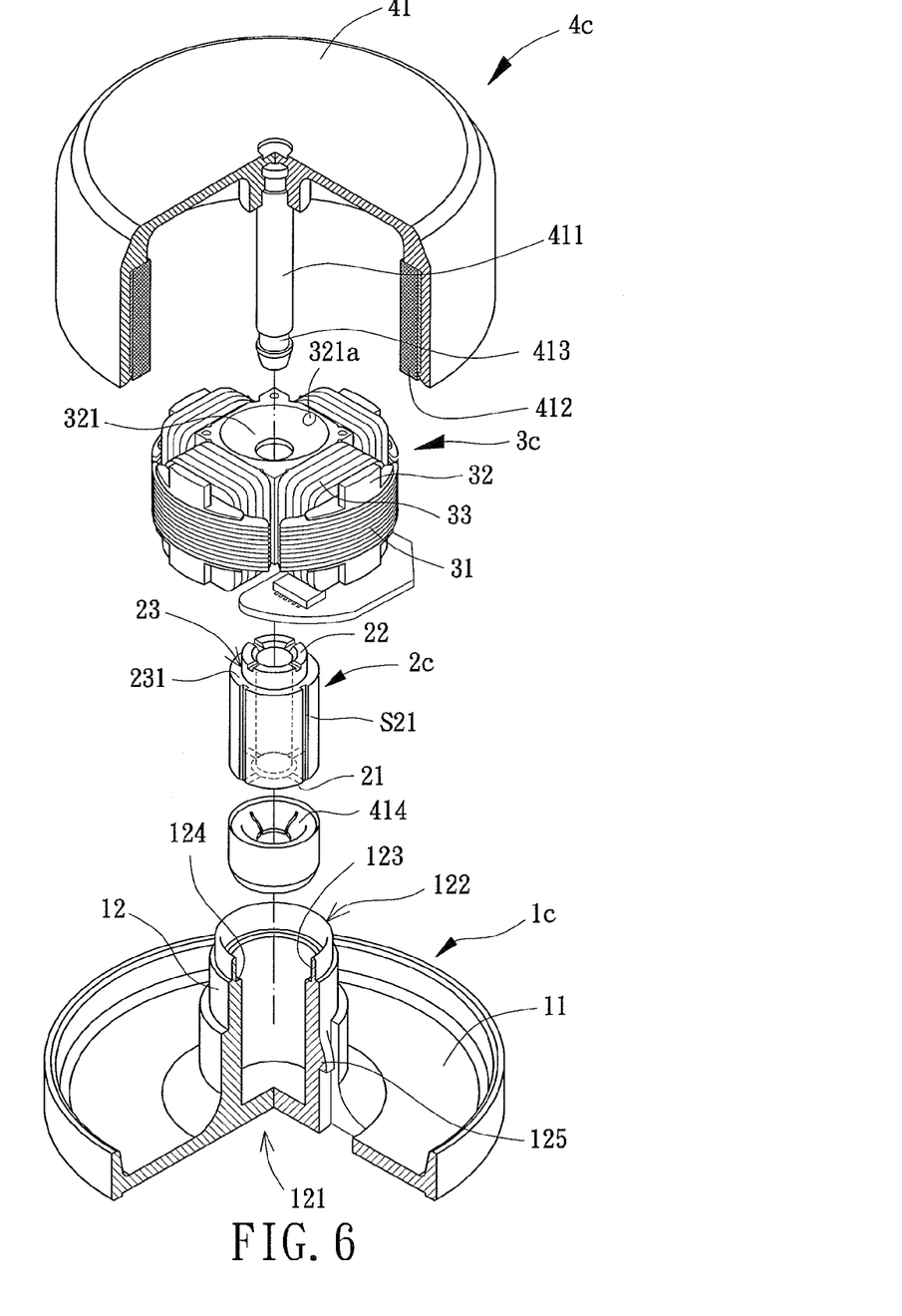
FIG. 6 an exploded view of a motor with an oil storage function according to a third embodiment of the invention.
Figure 7:
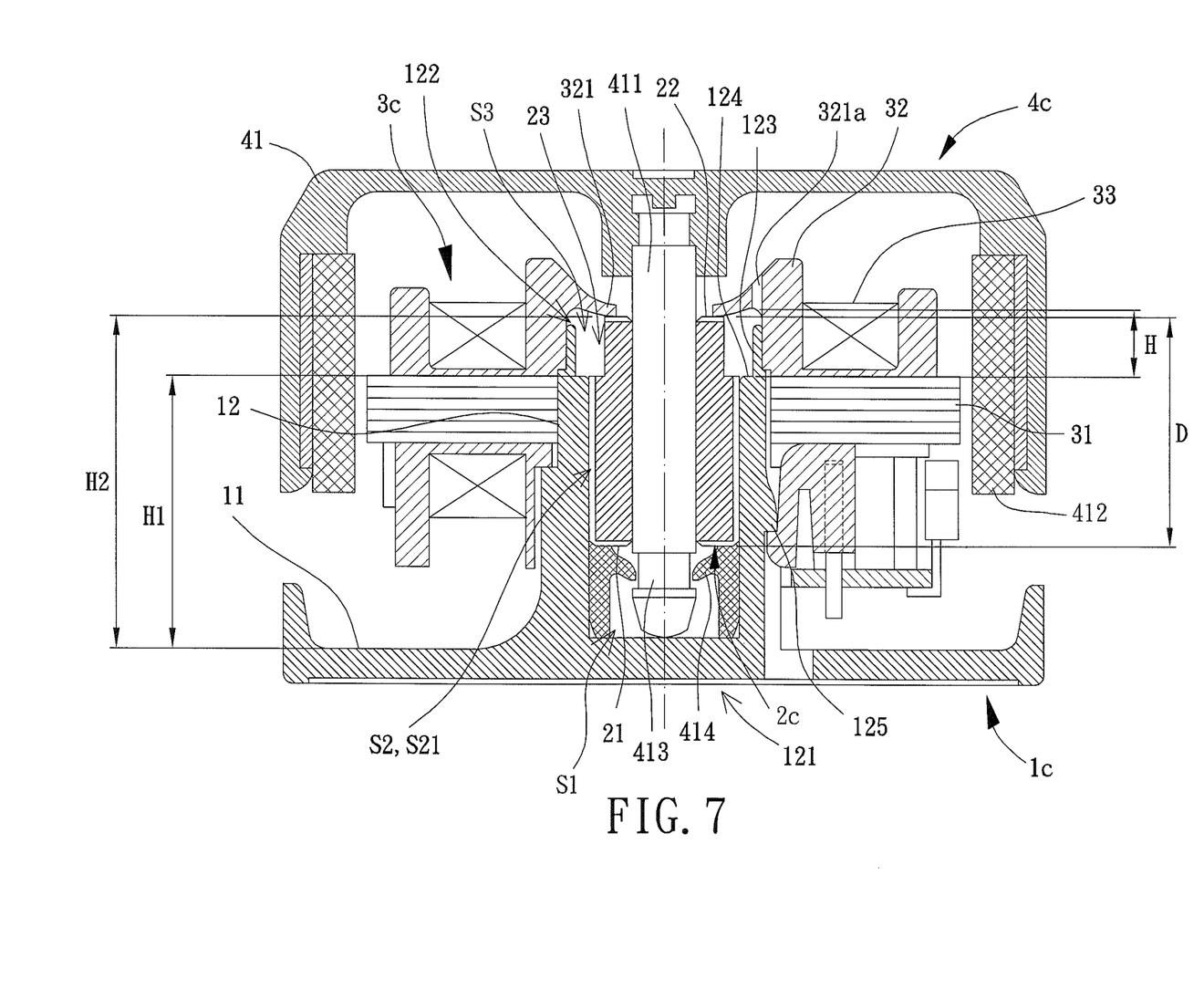
FIG. 7 is a cross-sectional view of the motor of the third embodiment of the invention.

Referring to FIGS. 6 and 7, a motor with an oil storage function is disclosed according to a third embodiment of the invention. Similar to the motor in the first embodiment, the motor in the third embodiment also comprises a base 1c, a bearing 2c, a stator unit 3c and a rotor 4c. The stator unit 3c in this embodiment is identical to the stator unit 3a in the first embodiment, the rotor 4e in this embodiment is identical to the rotor 4a in the first embodiment, the base 1c in this embodiment is identical to the base 1a in the first embodiment, and the bearing 2c in this embodiment is identical to the bearing 2b in the second embodiment. Similar structures are not described herein again for brevity.

Based on the base 1c and the bearing 2c, an enlarged oil chamber S3 is jointly formed by the bottom face of the blocking portion 321 (namely, the face of the blocking portion 321 facing the base plate portion 11 of the base 1c), the expansion section 123, the shoulder portion 124 and the recess portion 23 of the bearing 2c, as shown in FIG. 7. The enlarged oil chamber S3 communicates with the oil passageway S2, allowing the lower oil chamber S1, the oil passageway S2, the enlarged oil chamber S3 and the bearing 2c to jointly form a cyclic oil path for the lubricant oil to flow therein. This ensures smooth operation of the rotor 4c and prevents breakdown of the rotor 4c.

The recess portion 23 of the bearing 2c further comprises an annular shoulder portion 231, which may be located in a position aligned with the shoulder portion 124. Alternatively, the annular shoulder portion 231 may be located in a position higher or lower than the shoulder portion 124.

The motor in the third embodiment is characterized in forming the enlarged oil chamber S3 by the blocking portion 321, the expansion section 123, the shoulder portion 124, and the recess portion 23 of the bearing 2c, and the blocking portion 321 may be directly formed on the insulation unit 32 of the stator unit 3c. Thus, the enlarged oil chamber S3 will have an even larger space. Advantageously, the service life of the motor is prolonged. Convenient assembly and cost reduction are also achieved. Since the enlarged oil chamber S3 is jointly formed by both the recess portion 23 of the bearing 2c and the expansion section 123 of the shaft tube portion 12, the enlarged oil chamber S3 in the third embodiment is larger than the enlarged oil chamber S3 in both the first and second embodiments.

Figure 8:
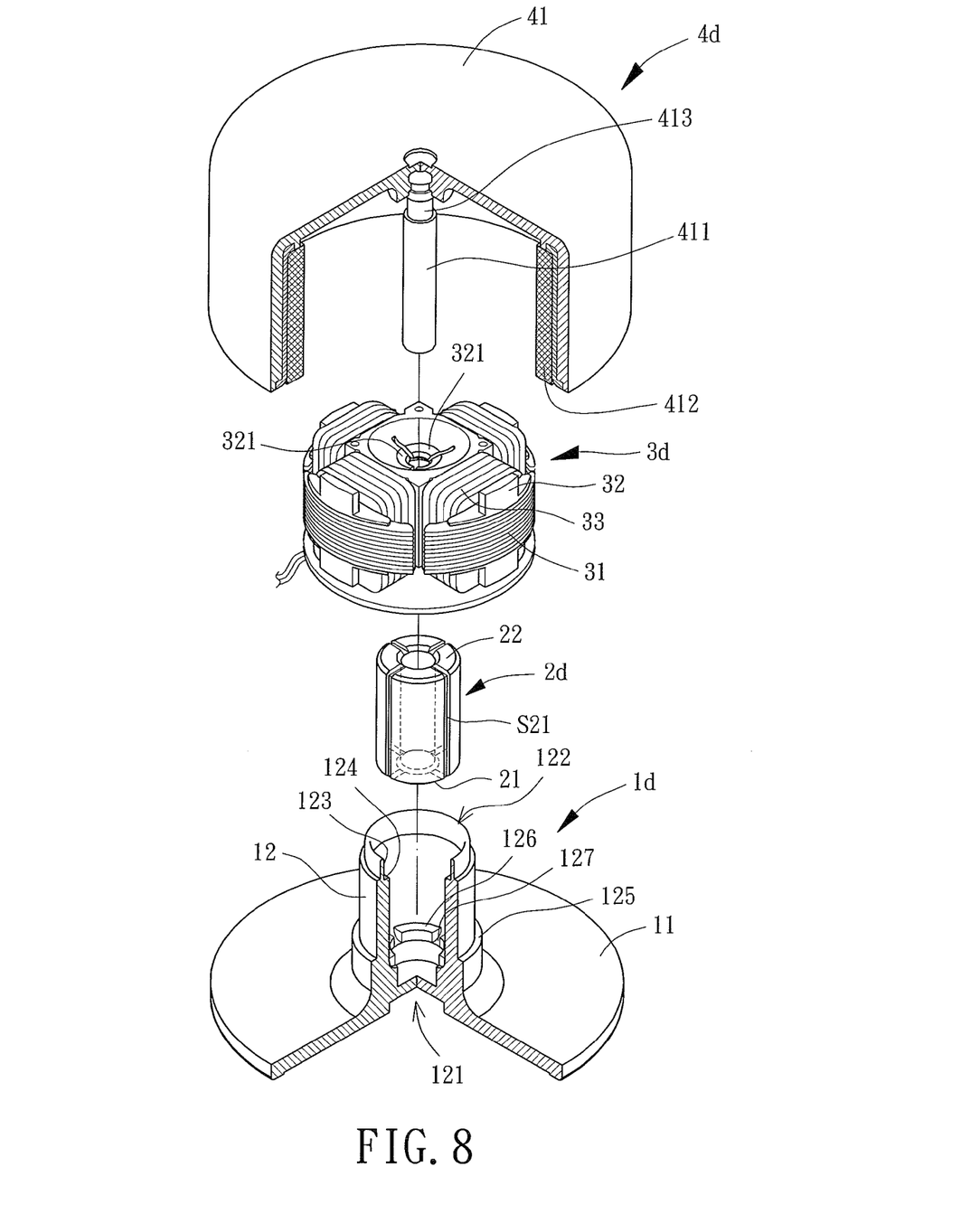
FIG. 8 is an exploded view of a motor with an oil storage function according to a fourth embodiment of the invention.
Figure 9:
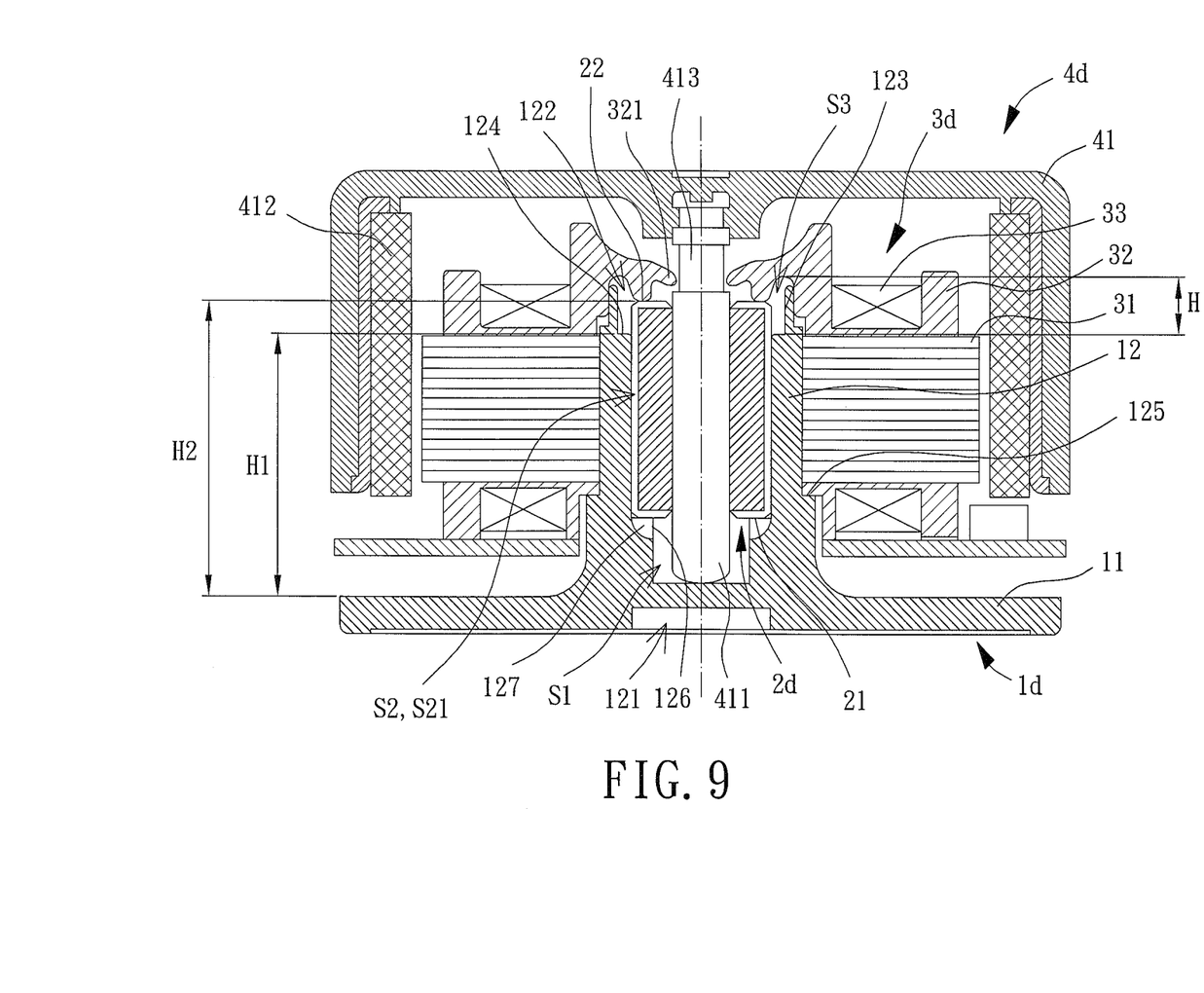
FIG. 9 is a cross-sectional view of the motor of the fourth embodiment of the invention.

Referring to FIGS. 8 and 9, a motor with an oil storage function is disclosed according to a fourth embodiment of the invention. Similar to the motor in the first embodiment, the motor in the fourth embodiment also comprises a base 1d, a bearing 2d, a stator unit 3d and a rotor 4d. The similarities between the base 1d and the base 1a, between the bearing 2d and the bearing 2a, between the stator unit 3d and the stator unit 3a, and between the rotor 4d and the rotor 4a, are not described again for brevity. The differences between these components are described as follows.

Different from the base 1a in the first embodiment is that the base 1d in the fourth embodiment no longer has the engaging member 414 shown in FIG. 3. Instead, an annular protrusion 126 is formed on the part of the inner circumferential wall of the shaft tube portion 12 adjacent the closed end 121, with the annular protrusion 126 forming a narrow section in the shaft tube portion 12. The bearing 2d may be positioned on the annular protrusion 126 to enhance the positioning strength of the bearing 2d. Moreover, the annular protrusion 126 may preferably have a plurality of notches 127 in communication with both the lower oil chamber S1 and the oil passageway S2. This allows the lubricant oil to flow into the lower oil chamber S1 through the notches 127.

Different from the stator unit 3a in the first embodiment is that the blocking portion 321 of the insulation unit 32 of the stator unit 3d is in the form of a plurality of engaging panels extending radially towards the open end 122 of the shaft tube portion 12. A groove is formed between two adjacent engaging panels.

The rotor 4d in the fourth embodiment differs from the rotor 4a in the first embodiment in that the neck 413 of the shaft 411 is adjacent to the open end 122 of the shaft tube portion 12. The engaging panels of the insulation unit 32 engage with the neck 413 of the shaft 411 to prevent disengagement of the rotor 4d from the bearing 2d.

The motor in the fourth embodiment is characterized in that the blocking portion 321 of the insulation unit 32 will better prevent disengagement of the rotor 4d from the bearing 2d. Thus, the engaging member 414 in the first, second and third embodiments can be omitted, reducing the component quantity and simplifying the structure of the motor.

Based on the motors described in the first to fourth embodiments, the invention is characterized in arranging the blocking portion 321 on the insulation unit 32 of the stator unit 3a, 3b, 3c, 3d in order to form the enlarged oil chamber S3 by the blocking portion 321, the shaft tube portion 12 and the bearing 2a, 2b, 2c, 2d. As shown in FIGS. 3, 5, 7 and 9, the enlarged oil chamber S3 has a height H. The first end face 21 and the second end face 22 are spaced from each other by a minimal axial distance D. The height H is preferably equal to or larger than 10% of the minimal axial distance D to provide a larger space for the enlarged oil chamber S3. Thus, the enlarged oil chamber S3 will be able to accommodate a larger amount of lubricant oil and is adjacent to the open end 122 of the shaft tube portion 12. Furthermore, the invention provides improved oil accommodation under a simple motor structure. Thus, the motors in the invention do have a longer service life, convenient assembly and lower cost.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor with an oil storage function comprising:
   a base comprising a shaft tube portion having a closed end and an open end;
   a bearing received in the shaft tube portion of the base;
   a stator unit fixed to the base and having an annular insulation unit and a blocking portion, wherein the annular insulation unit is fittingly coupled around the shaft tube, with the blocking portion extending radially from the annular insulation unit towards the open end of the shaft tube portion and terminating in an end having a bottom face pressing the bearing; and
   a rotor comprising a hub having a shaft and a permanent magnet, wherein the shaft is rotatably coupled with the bearing, wherein an air gap is formed between the permanent magnet and the stator unit, wherein the blocking portion of the stator unit, the shaft tube portion and the bearing jointly form an oil chamber at the open end of the shaft tube portion, and wherein the blocking portion of the stator unit has at least one vent adjacent to the annular insulation unit and spaced from and not intersecting with the bottom face communicating with the oil chamber.

2. The motor with the oil storage function as claimed in claim 1, wherein the bearing has a first end face facing the closed end and a second end face facing the open end of the shaft tube portion, and wherein the blocking portion of the stator unit has the bottom face pressing the second end face of the bearing.

3. The motor with the oil storage function as claimed in claim 2, wherein the oil chamber has a height in an axial direction of the rotor, wherein the first end face and the second end face of the bearing are spaced from each other by an axial distance, and wherein the height is equal to or larger than 10% of the axial distance.

4. The motor with the oil storage function as claimed in claim 1, wherein the shaft tube portion forms a positioning portion on an outer circumferential wall thereof, and wherein the stator unit is fitted around the shaft tube portion and positioned on the positioning portion.

5. The motor with the oil storage function as claimed in claim 1, wherein a neck is formed on an outer circumferential wall of the shaft, wherein an engaging member is arranged in the shaft tube portion and positioned between the bearing and the closed end of the shaft tube portion, and wherein the engaging member is engaged with the neck of the shaft.

6. The motor with the oil storage function as claimed in claim 1, wherein the stator unit has a core coupled with the annular insulation unit, wherein the annular insulation unit comprises an upper insulation sleeve and a lower insulation sleeve, wherein the core is sandwiched between the upper and lower insulation sleeves, and wherein the blocking portion is arranged on the upper insulation sleeve.

7. The motor with the oil storage function as claimed in claim 1, wherein the closed end of the shaft tube portion forms a lower oil chamber.

8. The motor with the oil storage function as claimed in claim 7, wherein an oil passageway is formed between the bearing and the shaft tube portion, and wherein the oil passageway communicates with the lower oil chamber and the oil chamber.

9. The motor with the oil storage function as claimed in claim 8, wherein the bearing forms a plurality of grooves axially extending on an outer circumferential wall thereof, and wherein the plurality of grooves forms the oil passageway.

10. The motor with the oil storage function as claimed in claim 1, wherein the blocking portion of the stator unit is located between the open end of the shaft tube portion and the hub of the rotor.

11. The motor with the oil storage function as claimed in claim 1, wherein the blocking portion has another end opposite to the end and distinct to the shaft, with the end of the blocking portion adjacent to the shaft, wherein the other end of the blocking portion is not in contact with a top surface of the bearing and the end of the blocking portion is in contact with a top surface of the bearing, wherein the blocking portion extends from the other end to the end in an inclined manner relative to the top surface of the bearing, and wherein the at least one vent is formed at the other end of the blocking portion distinct to the shaft and is not formed at the end of the blocking portion.

12. A motor with an oil storage function comprising:
a base comprising a base plate portion and a shaft tube portion coupled with the base plate portion, wherein the shaft tube portion has a closed end and an open end, wherein the shaft tube portion has an expansion section at the open end, wherein the expansion section forms a shoulder portion on an inner circumferential wall of the shaft tube portion;
a bearing received in the shaft tube portion of the base;
a stator unit fixed to the base and having an annular insulation unit and a blocking portion, wherein the insulation unit is fittingly coupled around the shaft tube, with the blocking portion extending radially from the annular insulation unit towards the open end of the shaft tube and terminating in an end having a bottom face pressing the bearing; and
a rotor comprising a hub having a shaft and a permanent magnet, wherein the shaft is rotatably coupled with the bearing, wherein an air gap is formed between the permanent magnet and the stator unit, wherein the bottom face of the blocking portion, the expansion section of the shaft tube portion, the shoulder portion, and an outer circumferential wall of the bearing jointly form an enlarged oil chamber, and wherein the blocking portion of the stator unit has at least one vent adjacent to the annular insulation unit and spaced from and not intersecting with the bottom face communicating with the oil chamber.

13. The motor with the oil storage function as claimed in claim 12, wherein the bearing has a first end face facing the closed end and a second end face facing the open end of the shaft tube portion, and wherein the blocking portion of the stator unit has the bottom face pressing the second end face of the bearing.

14. The motor with the oil storage function as claimed in claim 13, wherein the oil chamber has a height in an axial direction of the rotor, wherein the first end face and the second end face are spaced from each other by an axial distance, and wherein the height is equal to or larger than 10% of the axial distance.

15. The motor with the oil storage function as claimed in claim 12, wherein the shaft tube portion forms a positioning portion on an outer circumferential wall thereof, and wherein the stator unit is fitted around the shaft tube portion and positioned on the positioning portion.

16. The motor with the oil storage function as claimed in claim 12, wherein a neck is formed on an outer circumferential wall of the shaft, wherein an engaging member is arranged in the shaft tube portion and positioned between the bearing and the closed end of the shaft tube portion, and wherein the engaging member is engaged with the neck of the shaft.

17. The motor with the oil storage function as claimed in claim 12, wherein the stator unit has a core coupled with the annular insulation unit, wherein the annular insulation unit comprises an upper insulation sleeve and a lower insulation sleeve, wherein the core is sandwiched between the upper and lower insulation sleeves, and wherein the blocking portion is arranged on the upper insulation sleeve.

18. The motor with the oil storage function as claimed in claim 12, wherein the bearing has a first end face facing the closed end and a second end face facing the open end of the shaft tube portion, wherein the shoulder portion is spaced from the base plate portion by a first height, wherein the second end face is spaced from the base plate portion by a second height, and wherein the second height is larger than the first height.

19. The motor with the oil storage function as claimed in claim 12, wherein the closed end of the shaft tube portion is coupled with the base plate portion to form a lower oil chamber.

20. The motor with the oil storage function as claimed in claim 19, wherein an oil passageway is formed between the bearing and the shaft tube portion, wherein the oil passageway communicates with the lower oil chamber and the oil chamber, and wherein the at least one vent is spaced from and not intersecting with the groove.

21. The motor with the oil storage function as claimed in claim 20, wherein the bearing forms a plurality of grooves axially extending on an outer circumferential wall thereof, and wherein the plurality of grooves forms the oil passageway.

22. The motor with the oil storage function as claimed in claim 12, wherein the blocking portion of the stator unit is located between the open end of the shaft tube portion and the hub of the rotor.

23. The motor with the oil storage function as claimed in claim 12, wherein the blocking portion has another end opposite to the end and distinct to the shaft, with the end of the blocking portion adjacent to the shaft, wherein the other end of the blocking portion is not in contact with a top surface of the bearing and the end of the blocking portion is in contact with a top surface of the bearing, wherein the blocking portion extends from the other end to the end in an inclined manner relative to the top surface of the bearing, and wherein the at least one vent is formed at the other end of the blocking portion distinct to the shaft and is not formed at the end of the blocking portion.

24. A motor with an oil storage function comprising:
a base comprising a base plate portion and a shaft tube portion coupled with the base plate portion, wherein the shaft tube portion has a closed end and an open end;
a bearing received in the shaft tube portion of the base and having a first end face facing the closed end and a second end face facing the open end, wherein the bearing has an outer circumferential wall and forms a shrinkage section on the part of the outer circumferential wall adjacent the second end face of the bearing, wherein the shrinkage section forms a recess portion;

a stator unit fixed to the base and having an annular insulation unit and a blocking portion, wherein the annular insulation unit is fittingly coupled around the shaft tube, with the blocking portion extending radially from the annular insulation unit towards the open end of the shaft tube and terminating in an end having a bottom face pressing the bearing; and a rotor comprising a hub having a shaft and a permanent magnet, wherein the shaft is rotatably coupled with the bearing, wherein an air gap is formed between the permanent magnet and the stator unit, wherein the bottom face of the blocking portion, an inner circumferential wall of the shaft tube portion, and the recess portion of the bearing jointly form an oil chamber, wherein the blocking portion of the stator unit has at least one vent adjacent to the annular insulation unit and spaced from and not intersecting with the bottom face communicating with the oil chamber.

25. The motor with the oil storage function as claimed in claim 24, wherein the bottom face of the blocking portion presses the second end face of the bearing.

26. The motor with the oil storage function as claimed in claim 24, wherein the oil chamber has a height in an axial direction of the rotor, wherein the first end face and the second end face are spaced from each other by an axial distance, and wherein the height is equal to or larger than 10% of the axial distance.

27. The motor with the oil storage function as claimed in claim 24, wherein the shaft tube portion forms a positioning portion on an outer circumferential wall thereof, and wherein the stator unit is fitted around the shaft tube portion and positioned on the positioning portion.

28. The motor with the oil storage function as claimed in claim 24, wherein a neck is formed on an outer circumferential wall of the shaft, wherein an engaging member is arranged in the shaft tube portion and positioned between the bearing and the closed end of the shaft tube portion, and wherein the engaging member is engaged with the neck of the shaft.

29. The motor with the oil storage function as claimed in claim 24, wherein the stator unit has a core coupled with the annular insulation unit, wherein the annular insulation unit comprises an upper insulation sleeve and a lower insulation sleeve, wherein the core is sandwiched between the upper and lower insulation sleeves, and wherein the blocking portion is arranged on the upper insulation sleeve.

30. The motor with the oil storage function as claimed in claim 24, wherein the closed end of the shaft tube portion is coupled with the base plate portion to form a lower oil chamber.

31. The motor with the oil storage function as claimed in claim 30, wherein an oil passageway is formed between the bearing and the shaft tube portion, and wherein the oil passageway communicates with the lower oil chamber and the oil chamber.

32. The motor with the oil storage function as claimed in claim 31, wherein the bearing forms a plurality of grooves axially extending on an outer circumferential wall thereof, and wherein the plurality of grooves forms the oil passageway.

33. The motor with the oil storage function as claimed in claim 24, wherein the blocking portion of the stator unit is located between the open end of the shaft tube portion and the hub of the rotor.

34. The motor with the oil storage function as claimed in claim 24, wherein the blocking portion has another end opposite to the end and distinct to the shaft, with the end of the blocking portion adjacent to the shaft, wherein the other end of the blocking portion is not in contact with a top surface of the bearing and the end of the blocking portion is in contact with a top surface of the bearing, wherein the blocking portion extends from the other end to the end in an inclined manner relative to the top surface of the bearing, and wherein the at least one vent is formed at the other end of the blocking portion distinct to the shaft and is not formed at the end of the blocking portion.

35. A motor with an oil storage function comprising:
a base comprising a base plate portion and a shaft tube portion coupled with the base plate portion, wherein the shaft tube portion has a closed end and an open end, wherein the shaft tube portion has an expansion section at the open end, wherein the expansion section forms a shoulder portion on an inner circumferential wall of the shaft tube portion;

a bearing received in the shaft tube portion of the base, wherein the bearing has a first end face facing the closed end and a second end face facing the open end, wherein the bearing has an outer circumferential wall and forms a shrinkage section on the part of the outer circumferential wall adjacent the second end face of the bearing, wherein the shrinkage section forms a recess portion;

a stator unit fixed to the base and having an annular insulation unit and a blocking portion, wherein the annular insulation unit is fittingly coupled around the shaft tube, with the blocking portion extending radially from the annular insulation unit towards the open end of the shaft tube and terminating in an end having a bottom face pressing the bearing; and a rotor comprising a hub having a shaft and a permanent magnet, wherein the shaft is rotatably coupled with the bearing, wherein an air gap is formed between the permanent magnet and the stator unit, wherein the bottom face of the blocking portion, the expansion section of the shaft tube portion, the shoulder portion, and the recess portion of the bearing jointly form an oil chamber, and wherein the blocking portion of the stator unit has at least one vent adjacent to the annular insulation unit and spaced from and not intersecting with the bottom face communicating with the oil chamber.

36. The motor with the oil storage function as claimed in claim 35, wherein the bottom face of the blocking portion presses the second end face of the bearing.

37. The motor with the oil storage function as claimed in claim 35, wherein the oil chamber has a height in an axial direction of the rotor, wherein the first end face and the second end face are spaced from each other by an axial distance, and wherein the height is equal to or larger than 10% of the axial distance.

38. The motor with the oil storage function as claimed in claim 35, wherein the shaft tube portion forms a positioning portion on an outer circumferential wall thereof, and wherein the stator unit is fitted around the shaft tube portion and positioned on the positioning portion.

39. The motor with the oil storage function as claimed in claim 35, wherein a neck is formed on an outer circumferential wall of the shaft, wherein an engaging member is arranged in the shaft tube portion and positioned between the bearing and the closed end of the shaft tube portion, and wherein the engaging member is engaged with the neck of the shaft.

40. The motor with the oil storage function as claimed in claim 35, wherein the stator unit has a core coupled with the annular insulation unit, wherein the annular insulation unit comprises an upper insulation sleeve and a lower insulation sleeve, wherein the core is sandwiched between the upper and lower insulation sleeves, and wherein the blocking portion is arranged on the upper insulation sleeve.

41. The motor with the oil storage function as claimed in claim 35, wherein the closed end of the shaft tube portion is coupled with the base plate portion to form a lower oil chamber.

42. The motor with the oil storage function as claimed in claim 41, wherein an oil passageway is formed between the bearing and the shaft tube portion, and wherein the oil passageway communicates with the lower oil chamber and the oil chamber.

43. The motor with the oil storage function as claimed in claim 42, wherein the bearing forms a plurality of grooves axially extending on an outer circumferential wall thereof, and wherein the plurality of grooves forms the oil passageway.

44. The motor with the oil storage function as claimed in claim 35, wherein the blocking portion of the stator unit is located between the open end of the shaft tube portion and the hub of the rotor.

45. The motor with the oil storage function as claimed in claim 35, wherein the blocking portion has another end opposite to the end and distinct to the shaft, with the end of the blocking portion adjacent to the shaft, wherein the other end of the blocking portion is not in contact with a top surface of the bearing and the end of the blocking portion is in contact with a top surface of the bearing, wherein the blocking portion extends from the other end to the end in an inclined manner relative to the top surface of the bearing, and wherein the at least one vent is formed at the other end of the blocking portion distinct to the shaft and is not formed at the end of the blocking portion.

* * * * *